July 13, 1948.  E. M. FISK  2,445,025
CRANK-PIN BEARING
Original Filed May 19, 1941

Inventor,
EDWIN M. FISK,
By, Henry N. Young
Attorney,

Patented July 13, 1948

2,445,025

UNITED STATES PATENT OFFICE 2,445,025

CRANK-PIN BEARING

Edwin M. Fisk, Mission San Jose, Calif.

Original application May 19, 1941, Serial No. 394,097. Divided and this application November 15, 1943, Serial No. 510,355

3 Claims. (Cl. 74—580)

The invention relates to a crank pin bearing particularly adapted for use in radial type internal combustion engines, and the present application comprises a division of my application Serial No. 394,097, filed May 19, 1941, which application issued into Patent No. 2,334,185 on November 16, 1943.

An object of the invention is to provide a rugged and simple bearing connection for a plurality of connecting rods at a common crankpin or the like.

Another object is to provide an improved crankpin bearing means which is particularly adapted for use with a plurality of generally coplanar connecting rods of a radial engine.

The invention possesses other objects and features of invention, some of which, with the foregoing, will be set forth or be apparent in the following description of a typical embodiment thereof, and in the accompanying drawings, in which, Figure 1 is a fragmentary longitudinal section taken through a crankshaft having its crankpin provided with the present bearing.

Figure 1:
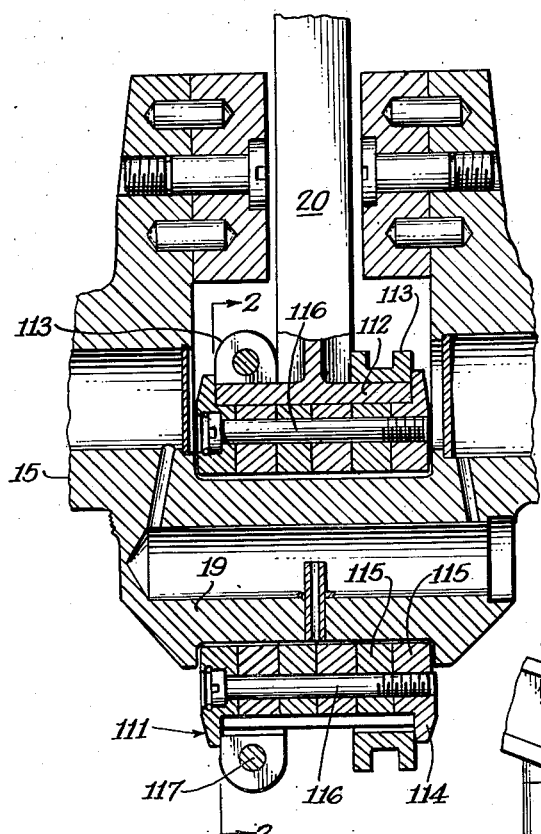
Figure 2:
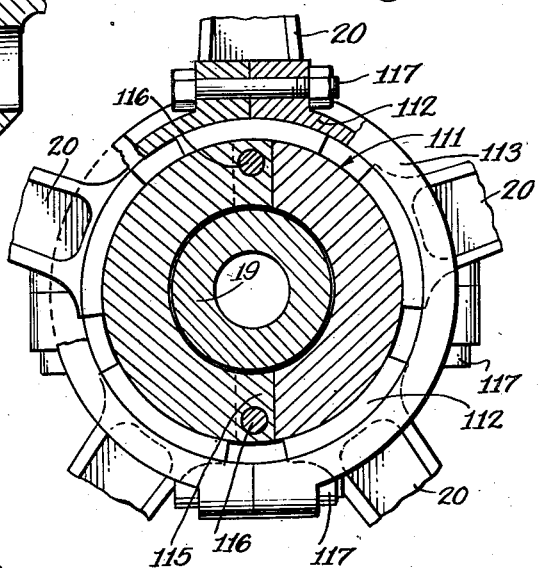
Figure 2 is a fragmentary sectional view at the line 2—2 in Figure 1.
Figure 3:
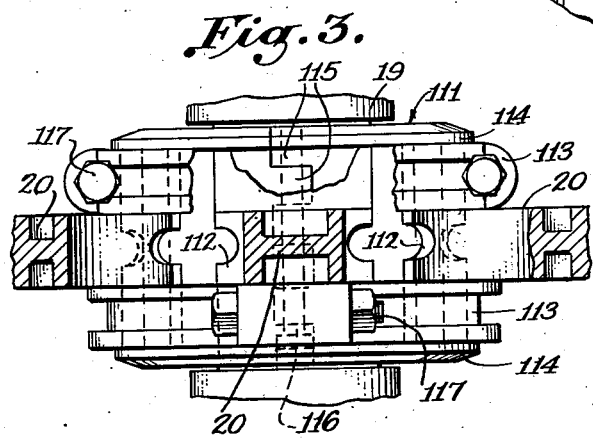
Figure 3 is a plan view of the showing of Figure 2.

The present bearing structure has been particularly designed for use with a crankshaft 15 arranged to be driven by pistons 17 which are operative in cylinders 18 radiating from the crankshaft axis in a common plane and connected to the same throw offset or crankpin 19 of the shaft by connecting rods 20, the cylinder plane being perpendicular to the crankshaft aris. The crankpin 19 may be counterbalanced by weighted shaft extensions extending radially from the opposite side of the shaft and spaced axially along the shaft to permit the operation of the connecting rods 20 between them.

As illustrated, the crankpin bearing of my invention essentially comprises a floating sleeve or bushing 111 mounted on the crankpin 19 and externally engaged at circumferentially spaced points thereabout by complementary slipper ends 112 of the connecting rods 20, said slippers being held in place by floating rings 113 at their opposite ends. The bearing sleeve 111 is preferably formed of a softer metal, such as bronze, than are the crankpin and connecting rod slippers, and is disposed in an annular circumferential seat groove of the crankpin in which it is rotatable while it is retained against axial shifting by the groove ends. The sleeve 111 is generally spool-shaped, having radial end flanges 114 which freely receive the slippers 112 between them against axial displacement of the slippers. The slippers 112 have cylindrically convex faces at opposite sides of their rods for complementarily engaging the bores of the rings 113 which are arranged for their retention in operative engagement with the slippers by their engagement between the rods and the sleeve flanges 114 which extend beyond the outer slipper faces.

The present bearing sleeve 111 is axially split to provide sections which have their opposed edges mortised or rabbeted together with complementary sets of tenons 115 for interengagement in their lines to secure the sections against relative axial movement. Screw pins 116 extend through registering bores provided in the aligned tenons 115 of the assembled sleeve whereby the sleeve may be mounted in the groove of the crankpin for its free rotation about the pin. The rings 113 are also diametrically split, and have their sections secured together by bolts 117 which are operative tangentially of and between the section ends to secure them together without effecting a tight engagement of the rings with the outer faces of the slippers. It will thus be understood that the sleeve 111 truly floats between the slippers and crankpin, and that the present bipartite structures for the sleeve 111 and the retaining rings 113 provides a crankpin bearing structure for a plurality of rods which may be assembled or disassembled with particular readiness.

From the foregoing description taken in connection with the accompanying drawings, the advantages of the construction and use of the present bearing will be readily understood by those skilled in the art to which the invention appertains. While I have described the features and principles of operation of an assembly which I now consider to comprise a preferred embodiment of my invention, I desire to have it understood that the showing is primarily illustrative, and that such changes may be made, when desired, as fall within the scope of the following claims.

I claim:

1. In combination with a shaft or the like providing an annular bearing groove therearound, a bearing sleeve floating in said shaft groove against axial shifting in the groove and comprising radially separable sections rabbeted together at their opposed edges and positively and releasably fixed together by pins extending axially through their rabbets.

2. In combination with a shaft or the like providing an annular bearing groove therearound, a bearing sleeve fittedly floating in said shaft groove and extending outwardly from the groove and comprising radially separable sections rabbeted together at their opposed edges and positively and releasably fixed together by screw pins extending axially through their rabbets outwardly of the groove.

3. In combination with a crankpin having an annular bearing groove therearound and arranged for connection with a plurality of connecting rods having terminal bearing slippers and providing an annular bearing groove therearound, a bearing sleeve fittedly floating in said crankpin groove and extending outwardly from the groove and providing an exterior bearing groove for the complementary engagement therein and circumferentially therearound of the bearing slippers of the different connecting rods, said sleeve comprising radially separable sections rabbeted together at their opposed edges and positively and releasably fixed together in the crankpin groove by pins extending axially through their rabbets outwardly of the crankpin groove and inwardly of the sleeve groove.

EDWIN M. FISK.

REFERENCES CITED

The following references are of record in the file of this patent:

UNITED STATES PATENTS

| Number | Name | Date |
|---|---|---|
| 378,978 | Ryan | Mar. 6, 1888 |
| 2,096,189 | Miller | Oct. 19, 1937 |

FOREIGN PATENTS

| Number | Country | Date |
|---|---|---|
| 448,915 | Great Britain | June 17, 1936 |
| 488,288 | Great Britain | July 5, 1938 |
| 662,567 | France | Mar. 19, 1929 |